(12) United States Patent
Jain et al.

(10) Patent No.: US 11,394,666 B2
(45) Date of Patent: Jul. 19, 2022

(54) SCALABLE COMMUNICATION WITH A PACKET PROCESSING UNIT

(71) Applicant: Intel Corporation, Santa Clara, CA (US)

(72) Inventors: Anjali S. Jain, Portland, OR (US); Donald Skidmore, Portland, OR (US); Parthasarathy Sarangam, Portland, OR (US); Joshua A. Hay, Hillsboro, OR (US); Ronen Chayat, Haifa (IL); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 1018 days.

(21) Appl. No.: 15/845,130

(22) Filed: Dec. 18, 2017

(65) Prior Publication Data

US 2019/0052583 A1 Feb. 14, 2019

(51) Int. Cl.
*H04L 49/90* (2022.01)
*H04L 69/22* (2022.01)
*H04L 45/00* (2022.01)

(52) U.S. Cl.
CPC .......... *H04L 49/9068* (2013.01); *H04L 45/66* (2013.01); *H04L 69/22* (2013.01); *G06F 2213/3808* (2013.01)

(58) Field of Classification Search
CPC ............. G06F 2213/3808; H04L 45/66; H04L 49/9068
See application file for complete search history.

(56) References Cited

U.S. PATENT DOCUMENTS

| 8,145,733 | B1* | 3/2012 | Cheng | H04L 43/028 709/220 |
| 8,873,561 | B2* | 10/2014 | Tighe | H04L 41/22 370/395.2 |
| 2008/0104369 | A1* | 5/2008 | Reed | G06F 15/17356 712/28 |
| 2009/0003298 | A1* | 1/2009 | Chu | H04L 45/66 370/338 |
| 2014/0071866 | A1* | 3/2014 | Maciocco | H04W 52/0229 370/311 |
| 2014/0122634 | A1* | 5/2014 | Conner | G06F 13/4027 709/212 |
| 2016/0261428 | A1* | 9/2016 | Song | H04L 61/103 |
| 2017/0208015 | A1* | 7/2017 | Volkening | H04L 49/109 |

* cited by examiner

*Primary Examiner* — Mounir Moutaouakil
(74) *Attorney, Agent, or Firm* — Compass IP Law PC (57) ABSTRACT

Particular embodiments described herein provide for a system for enabling communication between a packet processing unit and a network interface controller (NIC) using an extension object, the system can include memory, one or more processors, and a processing unit extension object engine. The processing unit extension object engine can be configured to cause a packet to be received at the packet processing unit, where the packet processing unit is on a system on chip (SoC), add an extension object portion to the packet to create a modified packet, and cause the modified packet to be communicated to the NIC located on the same SoC. In an example, the extension object portion includes type data and partition data. The packet can be an Ethernet packet and the extension object portion can be added before a payload portion of the packet.

23 Claims, 8 Drawing Sheets

SCALABLE COMMUNICATION WITH A PACKET PROCESSING UNIT

BACKGROUND

Emerging network trends in both data center and telecommunication networks place increasing performance demands on a system. Application performance depends on good use of the network and efficient use of the data traffic on the network. A network interface controller (NIC), also known as a network interface card, network adapter, LAN adapter, physical network interface, and other similar terms, is a computer hardware component that connects a computer to a network and provides applications with a dedicated, full-time connection to the network. Often, the NIC is included on a system on chip (SoC). An SoC is an integrated circuit (also known as an "IC" or "chip") that integrates components of a computer or other electronic systems on a substrate, typically silicon. The SoC may contain digital, analog, mixed-signal, and often radio-frequency functions, all on a single substrate

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for enabling scalable communication with a packet processing unit. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
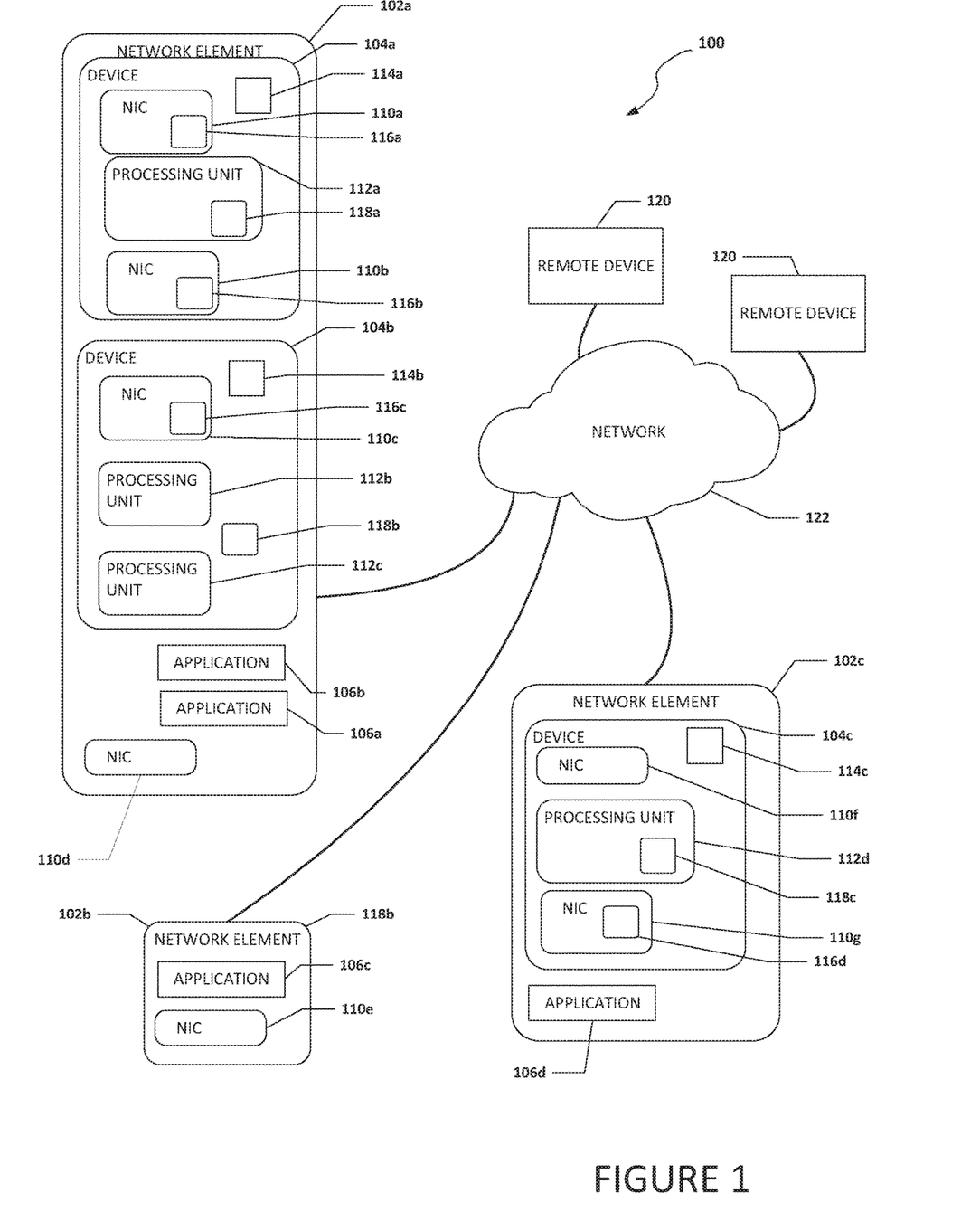
FIG. 1 is a block diagram of a system to enable scalable communication with a packet processing unit, in accordance with an embodiment of the present disclosure.

FIG. 1 is a block diagram of a system 100 to enable scalable communication with a packet processing unit, in accordance with an embodiment of the present disclosure. System 100 can include one or more network elements 102*a*-102*c* and one or more remote devices 120. Network element 102*a* can include one or more devices 104*a* and 104*b* and one or more applications 106*a* and 106*b*. Device 104*a* can include one or more network interface controllers (NICs) 110*a* and 110*b*, a processing unit 112*a*, and one or more queues 114*a*. Each one or more NICs can include a NIC extension object engine. For example, NIC 110*a* can include a NIC extension object engine 116*a* and NIC 110*b* can include a NIC extension object engine 116*b*. Processing unit 112*a* can include a processing unit extension object engine 118*a*. Device 104*b* can include a NIC 110*c*, one or more processing units 112*b* and 112*c*, and one or more queues 114*b*. Processing unit 112*b* and 112*c* can share a processing unit extension object engine 118*b*. In an example, network element 102*a* can also include a NIC 110*d*. Network element 102*b* can include an application 106*c*, and a NIC 110*e*. Network element 102*c* can include a device 104*c*, and an application 106*d*. Device 104*c* can include one or more NICs 110*f* and 110*g*, a processing unit 112*d*, and one or more queues 114c. Network elements 102a-102c may be in communication with each other using network 122.

Each device 104a-104c may be a system on a chip (SoCs), multiple chip package (MCP), discrete components linked together on a board, etc. Each processing unit 112a-112d may be an external programmable entity such as an FPGA, an accelerator, a packet processing unit, or some other processing unit. Each application 106a and 106b may be a virtual network function (VNF).

It is to be understood that other embodiments may be utilized and structural changes may be made without departing from the scope of the present disclosure. For example, each network element may have one or more devices and each device may have one or more NICs and processing units. Substantial flexibility is provided by system 100 in that any suitable arrangements and configuration may be provided without departing from the teachings of the present disclosure.

System 100 can be configured to allow for a scalable, bi-directional in-band messaging infrastructure in the form of a scalable extension object portion of a packet for communication between the NIC and the processing unit. The extension object portion of the packet can include partitions. The partitions can include metadata to help the NIC or application process the packet. On the transmit path, the NIC can insert an extension objects portion into a packet to communicate metadata to the processing unit or an application. In an example, the extension object portion is processed and stripped from the packet by the processing unit so that extension object portion of the packet persists only within the NIC to processing unit boundary region. On the receive path the extension object portion can be produced by the processing unit and processed and stripped by the NIC. In some examples, it may be desirable to retain part or all of the extension object portion when the packet is communicated from the NIC to an application to convey data to the application.

Elements of FIG. 1 may be coupled to one another through one or more interfaces employing any suitable connections (wired or wireless), which provide viable pathways for network (e.g., network 122, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Contemporary networking devices such as NICs can undergo significant strain to provide the required degree of programming flexibility and agility in adapting to new use cases and providing additional features. In many current systems, there are devices in front of the NIC and the NIC is typically not a discrete NIC but part of a SoC. Current solutions treat the NIC and other devices as separate entities where each is programmed by an independent channel (e.g., separate PCIe lanes) and each provides its own monolithic processing model. In addition, the pace of innovation in some systems (e.g., some cloud and network virtual function (NFV) markets) outpaces the regular cadence of current SoCs, especially application-specific integrated circuit (ASIC) silicon development. The requirement for additional features is typically addressed by adding an FPGA based packet processing unit on an SoC which results in a NIC+ FPGA platform. The FPGA is a highly programmable device that can be configured to perform analysis of packets and then pass the packet to the NIC. However, it is not just enough to pass a packet from the FPGA to the NIC, the packet also needs to pass some additional information, such as the results of the analysis by the FPGA (e.g., what type of security is associated with the packet, is it an IPSec packet, what destination or queue should receive the packet, etc.). What is needed is a system that can deliver some sort of extra information to the NIC about the processing that has already been done or what needs to be done for the packet and can enable processing synergy between the NIC and packet processing unit/accelerator.

A system to enable processing synergy between a NIC and a processing unit, as outlined in FIG. 1, can resolve these issues (and others). System 100 can be configured to enable processing synergy between a NIC (e.g., NIC 110a) and one or more processing units (e.g., processing unit 112a) by adding a scalable in-band extension object portion to packets for distributed workload processing. The added extension object portion can allow the processing unit to provide different metadata to the NIC depending on the configuration of the processing unit. For example, depending on the type of packet being communicated by the processing unit and the configuration of the processing unit, different packets can include different types and lengths of extension object portions. The extension object portions can be added to packets that are communicated between a NIC and a processing unit, a NIC and one or more processing units, one or more NICs and a processing unit, and/or one or more NICs and one or more processing units. Each extension object portion can include one or more partitions and each partition can include packet-specific context, metadata, processing rules, receive descriptor extensions to be used by an application, FPGA programming streams, or other application-specific objects.

In an example, a packet processing unit can be added in tandem with an existing NIC to extend the NIC's packet processing functionality. A NIC extension engine (e.g., NIC extension object engine 116a) and/or a processing unit extension engine (e.g., processing unit extension object engine 118a) can be configured to allow for an extension object portion to be inserted into packets communicated between the NIC and processing unit to help with inline packet processing and to communicate metadata between the NIC and processing unit. In a specific example, an existing driver for the NIC can be extended to configure the processing unit using network packets that are specially tagged with extension tags that help program the processing unit and/or carry metadata necessary for packet processing within the NIC and processing unit. If the NIC or application is configured to provide some sort of feedback to the processing unit (e.g., queue eight is full or queue one is low), processing unit can then add one or more partitions in the extension object portion to packets going to the NIC and provide guidance on how to handle the packet (e.g., to what queue or queues the data should be sent or to what queue or queues the data should not be sent). In another example, priority of a packet may be based on something else other than what is in the standard packet fields and processing unit can include a type indicator in the extension object portion that causes the NIC to ignore the priority that is normally assigned to the packet based on the standard packet fields and assign a different priority to the packet.

The NIC and packet processing unit can send control messages/asynchronous events back to a host (e.g., network element 102a) or application (e.g., application 106a) using the extension object portion of the packet. In a specific example, the extension object portion can include data that can be used to route packets to a queue (e.g., one or more queues 114a) that can be associated with a software control agent in an existing driver in a hypervisor or a virtual machine. This helps repurpose a data queue (e.g., direct memory access (DMA) que) to be used like a control queue and can provide a full-rate in-band messaging infrastructure for exchanging extension tags and partitions between the NIC and processing unit.

Current SoCs that include a NIC and an FPGA treat the FPGA as a separate bump in-the-wire island. The FPGA is programmed independently from the NIC and performs its own monolithic processing model. For example, an FPGA which handles overlay processing encapsulates transmit packets from the NIC and, even though the packet was already parsed by the NIC, the FPGA is required to parse each transmit packet to determine where to insert the overlay headers. Because the parsing information is internal to the NIC, it is lost on the NIC-to-FPGA boundary and needs to be recreated once again by the FPGA. System 100 can be configured for conveying an extension object portion that can be used for carrying parsing results from the NIC as metadata in one or more partitions to the processing unit and thereby preserve a unified programming model for the NIC and processing unit. This takes advantage of exiting silicon functionality, avoids a complete redesign of the SoC, and extends itself well to NFV applications.

Different applications (e.g., different VNFs) require different protocols, processing, etc. Some services require inspection and/or analysis of the payload portion of the packet, some ignore the payload portion and only inspect and/or analyze headers. Depending on the applications that are being executed, system 100 can be configured to enable the processing unit to help inspect and/or analyze the header portion of the packet, process the header portion of the packet, and/or communicate relevant metadata related to the header to the application. If the application wants to analyze and/or inspect headers only, the processing unit can provide and extract the relevant metadata regarding the headers and provide the relevant metadata to the application. If an application is interested in the payload, system 100 can be configured to enable the processing unit to help inspect and/or analyze the payload portion of the packet, process the payload portion of the packet, and/or communicate relevant metadata related to the payload portion (e.g., byte, type, etc.) to the application. Processing unit can provide metadata to the NIC and the NIC can provide some feedback from the host, application, or application to the processing unit.

System 100 can be configured to extend the lifetime of existing SoCs by allowing for the NIC and processing unit to use existing base silicon without a processing unit configured to enable an extension object portion. For applications that need extended processing, the system can be configured to use the existing base silicon with a processing unit configured to enable an extension object portion or an additional processing unit that is configured to enable extension object portions can be added to current SoCs. This can help keep the product cost relatively low and allow the system to scale relatively easily to NFV use cases. In order to support extension object portions in existing silicon, programmable extension tags can be inserted/stripped to/from the NIC and the processing unit which can help with inline packet processing.

In some examples, the existing silicon can be configured to route packets based on the extension tag into a repurposed data queue pair (e.g., one or more queues 114a) which then acts like a control and event queue. This can help with the ease of extending an existing multi-queue driver to take advantage of the acceleration features provided by the NIC and the processing unit. Spare data queue pairs (e.g., one or more queues 114a) can also be built into existing silicon to use for special NIC and processing unit programming.

Extension object portions may include partitions and the partitions can include intermediate processing results from the NIC, such as protocol offsets and classification indicators. Similarly, the partitions may include processing results from the processing unit such as encryption success/fail results, port association of the packet, arrival timestamps, etc. In some other applications, the partitions may also be used for programming the processing unit. The extension object portions can be embedded either within regular traffic packets or within unique programming packets that serve as containers. The programming packets may include classification rules, personality profiles, FPGA-specific streams, etc. The extension object portion can be communicated over standard Ethernet in the EtherType section of the packet. The extension object portion is stackable (i.e., the extension object portion is added on-top of the existing EtherType contents of the original packet) so that the structure of the original packet is preserved and the resulting packet can be forwarded by standard Ethernet Switches when multiple NICs and processing units are deployed in a meshed topology.

Turning to the infrastructure of FIG. 1, system 100 in accordance with an example embodiment is shown. Generally, system 100 may be implemented in any type or topology of networks. Network 122 represents a series of points or nodes of interconnected communication paths for receiving and transmitting packets of information that propagate through system 100. Network 122 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address.

These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. The term "status" is to include a state, condition, level of operation of a resource, congestion of the network, data related to traffic or flow patterns of the network, or another type of data or information that helps to determine the performance, state, condition, etc. of the network and/or a resource, either overall or related to one or more network elements. Additionally, messages, requests, responses, and queries are forms of network traffic, and therefore, may comprise packets, frames, signals, data, etc.

In an example implementation, network elements 102a-102c, are meant to encompass network elements, network appliances, servers, routers, switches, gateways, bridges, load balancers, processors, modules, or any other suitable device, component, element, or object operable to exchange information in a network environment. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102c may be virtual or include virtual elements.

In regards to the internal structure associated with system 100, each of network elements 102a-102c can include memory elements for storing information to be used in the operations outlined herein. Each of network elements 102a-102c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102c may include software modules (e.g., NIC extension object engine 116a, processing unit extension object engine 118b, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
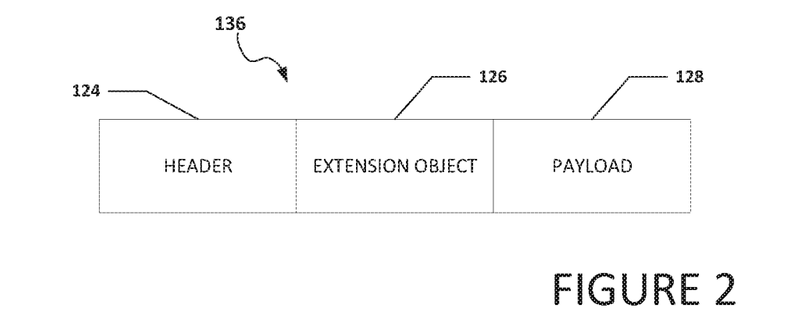
FIG. 2 is a block diagram of a portion of a system to enable scalable communication with a packet processing unit, in accordance with an embodiment of the present disclosure.

Turning to FIG. 2, FIG. 2 is a block diagram of an example of a packet 136 for use in system 100. Packet 136 can include a header portion 124, an extension object portion 126, and a payload portion 128. Extension object portion 126 can be located before a Layer 3 portion of packet 136. In an example, extension object portion 126 can be located in front of payload portion 128.

Figure 3:
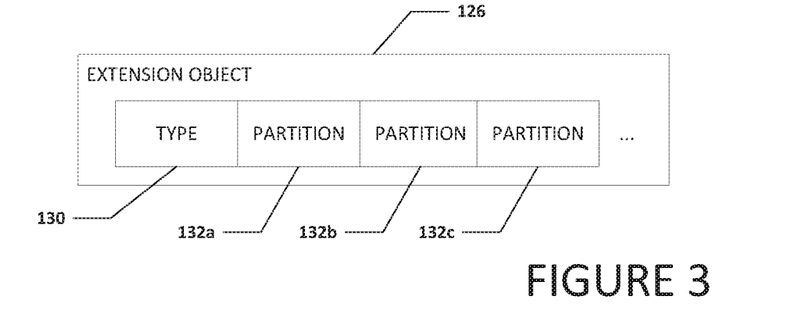
FIG. 3 is a block diagram of a portion of a system to enable scalable communication with a packet processing unit, in accordance with an embodiment of the present disclosure.

Turning to FIG. 3, FIG. 3 is a block diagram illustrating example details of extension object portion 126 for use in system 100, in accordance with an embodiment of the present disclosure. Extension object portion 126 can include a type portion 130 and one or more partition portions 132a-132c. Type portion 130 can include data other than type data in header portion 124 to help identify packet 136. For example, type portion 130 may identify packet 136 as a specific type or source of a video frame, a VOIP frame, a priority frame, a packet with enhanced quality of service, an index or queue for the packet to be delivered, a sequence number related to packet 136, etc. Each of one or more partition portions 132a-132c can include data to help the NIC process, analyze, and/or route packet 136. For example, each of one or more partition portions 132a-132c can include packet-specific context, metadata, processing rules, receive descriptor extensions to be used by an application, FPGA programming streams, inline IP Sec security indexes after decryption, parsing information, load balancing routing, etc.

In an example, a packet with the same or similar header portion 124 and payload portion 128 but with different extension object portions 126 may be communicated to the same NIC. In addition, a packet with similar header portions 124 (e.g., the destination identifier is changed), payload portion 128, and extension object portions 126 may be communicated to a plurality of NICs. Also, a packet with similar header portions 124 (e.g., the destination identifier is changed), payload portion 128, and different extension object portions 126 may be communicated to a plurality of NICs. In a specific example, a packet processing unit (e.g., processing unit 112a) can process 200 gigabits per second but NIC 110a can only process 100 gigabits per second. Using an extension object engine (e.g., processing unit extension object engine 118a), the processing unit can send 100 gigabits to NIC 110a and another 100 gigabits to NIC 110b, to NIC 110c on another device 104b, or NIC 110f in another network element 102c.

Figure 4:
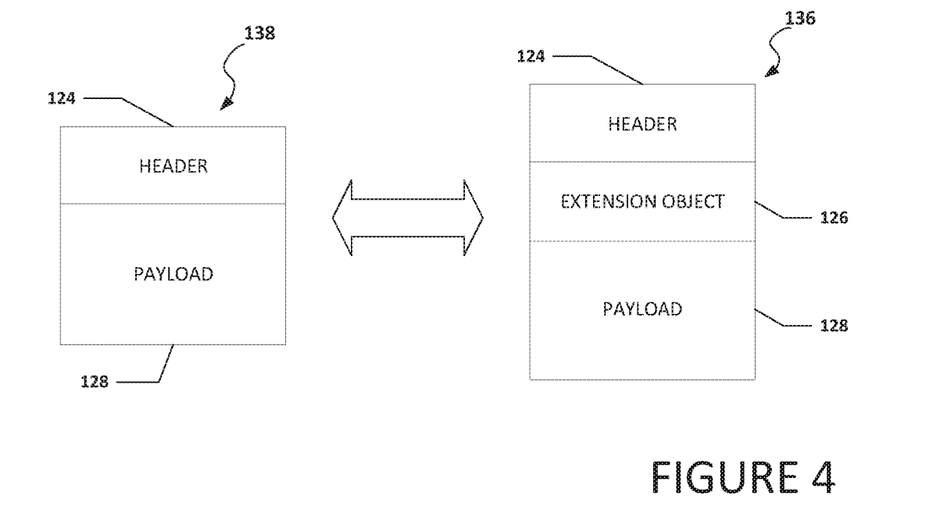
FIG. 4 is a block diagram of a portion of a system to enable scalable communication with a packet processing unit, in accordance with an embodiment of the present disclosure.

Turning to FIG. 4, FIG. 4 is a block diagram of example details of of a portion of system 100, in accordance with an embodiment of the present disclosure. Header portion 124 can include header information (e.g., a source identifier, a destination identifier, type, etc.) for packet 138. In an example, if packet 138 is an Ethernet packet, head portion 124 can include a MAC destination address, a MAC source address, packet type identifier, etc. Extension object portion 126 can be inserted into packet 138 to create packet 136 for communications between one or more NICs and a processing unit.

Figure 5:
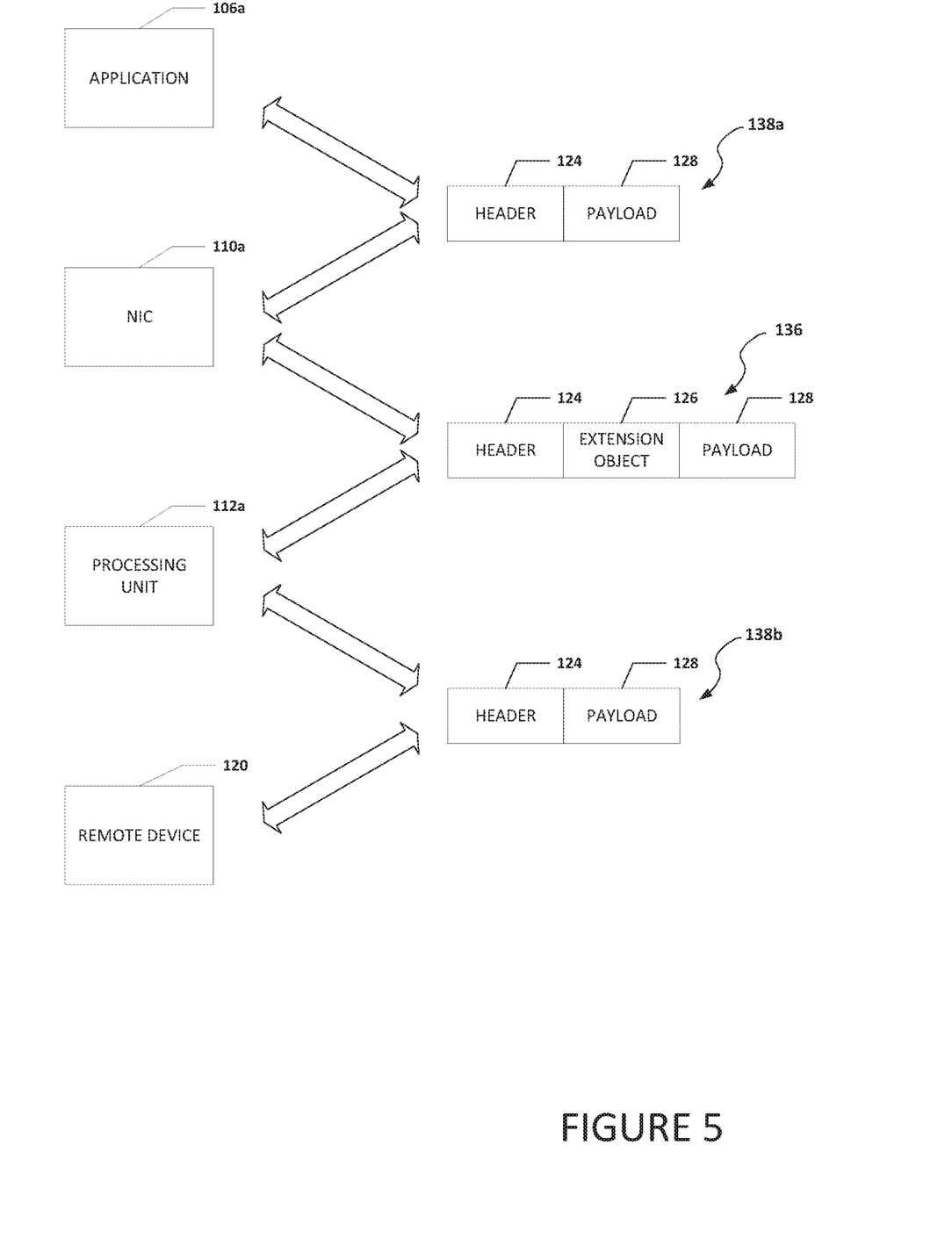
FIG. 5 is a block diagram of a portion of a system to enable scalable communication with a packet processing unit, in accordance with an embodiment of the present disclosure.

Turning to FIG. 5, FIG. 5 is a block diagram of a portion of system 100, in accordance with an embodiment of the present disclosure. In an example, application 106a can communicate packet 138a to NIC 110a to request data and/or one or more services. NIC 110a can receive packet 138a and in response, communicate a packet similar to packet 138a (a packet that does not include extension object portion 126) or a modified packet 136 to processing unit 112a. Processing unit 112a can received modified packet 136, remove extension object portion 126, and communicate a packet 138b to remote device 120 to satisfy the request for data and/or one or more services.

In response to the request, remote device 120 can respond to processing unit 112a using packet 138b. Processing unit 112a can receive the response and communicate modified packet 136 to NIC 110a. NIC 110a can received modified packet 136, remove extension object portion 126, and communicate packet 138a to application 106a. In an example, extension object portion 126 can be hidden from application 106a. NIC 110a can perform or initiate one or more actions based on the data in extension object portion 126, (e.g., select queue or application to send the packet or data related to the packet, etc.) and then remove extension object portion 126 before communicating packet 138a to application 106a.

Figure 6:
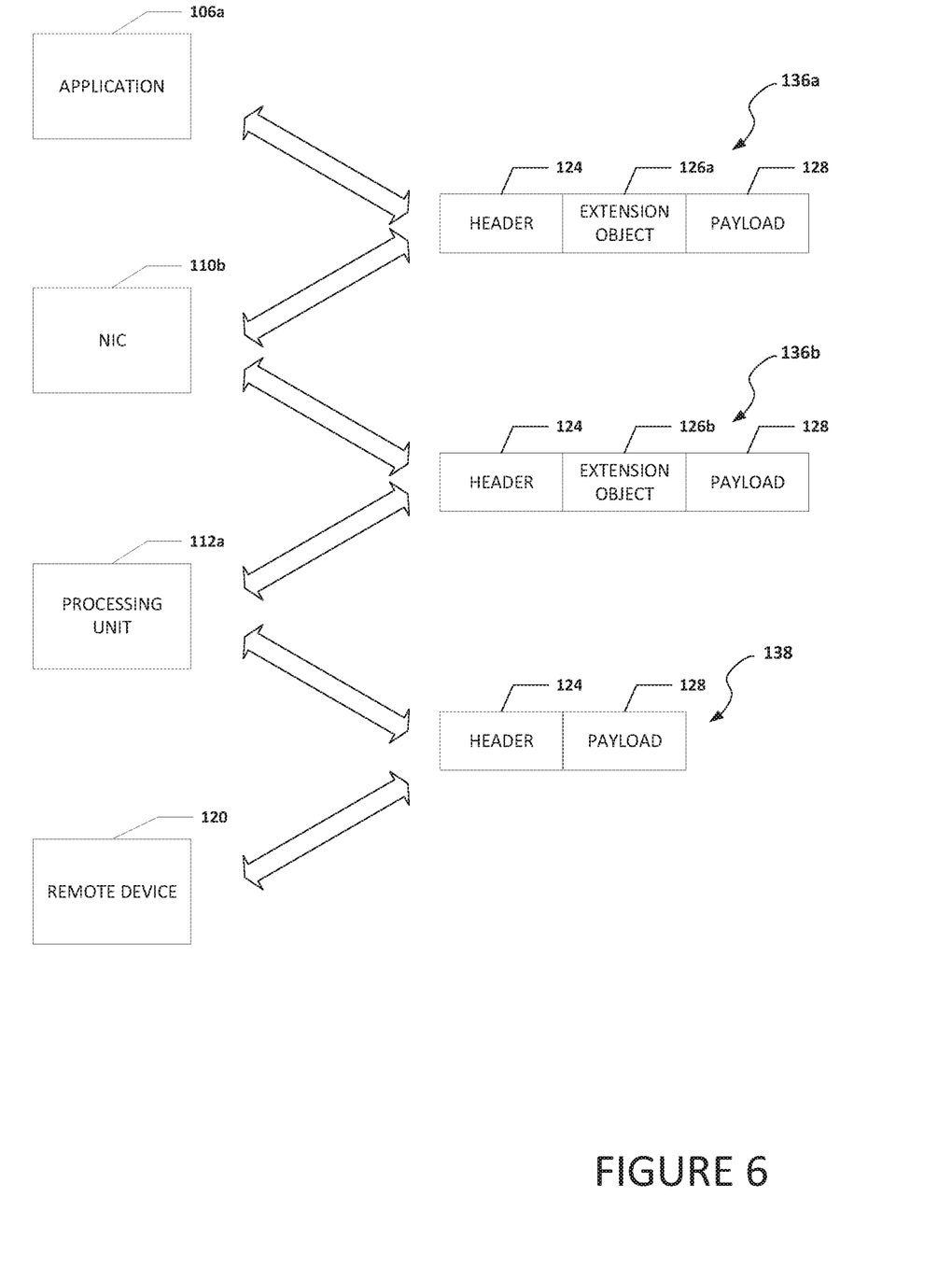
FIG. 6 is a block diagram of a portion of a system to enable scalable communication with a packet processing unit, in accordance with an embodiment of the present disclosure.

Turning to FIG. 6, FIG. 6 is a block diagram of a portion of system 100, in accordance with an embodiment of the present disclosure. In an example, application 106a can communicate a packet to NIC 110a to request data and/or one or more services. The packet may be similar to packet 138a and not include an extension object portion 126 or application 106a may communicate a modified packet 136a to NIC 110a. Modified packet 136a can include header portion 124, an extension object portion 126a, and payload portion 128. Extension object portion 126a can be similar to extension object portion 126, include similar data to extension object portion 126, include a portion of the data in extension object portion 126, or include different data than the data in extension object portion 126. NIC 110a can receive the packet and in response, communicate modified packet 136b to processing unit 112a. Modified packet 136b can include header portion 124, an extension object portion 126b, and payload portion 128. Extension object portion 126b can be similar to extension object portion 126 and/or 126a, include similar data to extension object portion 126 and/or 126a, include a portion of the data in extension object portion 126 and/or 126a, or include different data than the data in extension object portion 126 and/or 126a. Processing unit 112a can received modified packet 136b, remove extension object portion 126, and communicate packet 138 to remote device 120 to satisfy the request for data and/or one or more services.

In response to the request, remote device 120 can respond to processing unit 112a using packet 138. Processing unit 112a can receive the response and communicate modified packet 136b to NIC 110a. NIC 110a can received modified packet 136b and communicate modified packet 138a to application 106a. NIC 110a can add to or keep all or a portion of extension object portion 126 in modified packet 136b when communicating modified packet 136a to communicate information to application 106a.

Figure 7:
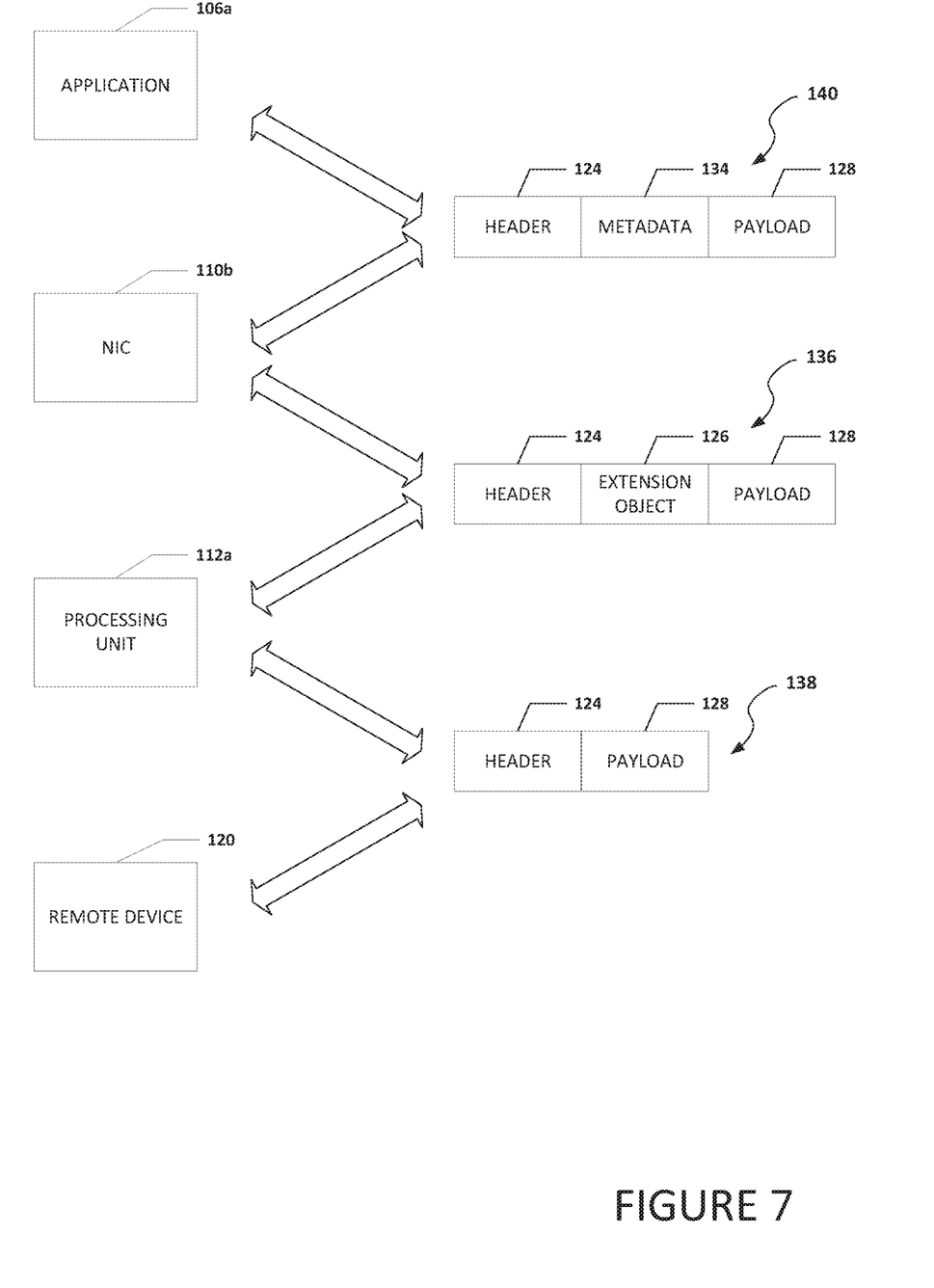
FIG. 7 is a block diagram of a portion of a system to enable scalable communication with a packet processing unit, in accordance with an embodiment of the present disclosure.

Turning to FIG. 7, FIG. 7 is a block diagram of a portion of system 100, in accordance with an embodiment of the present disclosure. In an example, application 106a can communicate a metadata packet 140 to NIC 110a to request data and/or one or more services. Metadata packet 140 can include header portion 124, a metadata portion 134, and payload portion 128. Metadata portion 134 can include metadata, an extension tag, or other data. In an example, metadata packet 140 can include an L2 extension tag that has a predefined length. Metadata portion 134 can be used by the application to provide feedback to NIC 110a and/or processing unit 112a, to request data or specific routing of packets by NIC 110a, to request specific programming for processing unit 112a, or other requests for specific packet routing and/or processing. NIC 110a and processing unit 112a can use the data in metadata portion 134 to determine the data that will be included in extension object portion 126.

NIC 110a can receive metadata packet 140 and in response, communicate modified packet 136 to processing unit 112a. Processing unit 112a can received modified packet 136, remove extension object portion 126, and communicate packet 138 to remote device 120 to satisfy the request for data and/or one or more services. In response to the request, remote device 120 can respond to processing unit 112a using packet 138. Processing unit 112a can receive the response and communicate modified packet 136b to NIC 110a. NIC 110a can received modified packet 136b, and communicate a packet similar to packet 138, a modified packet similar to modified packet 138a, or an extension tag packet similar to metadata packet 140 to application 106a. In response, application 106a can use metadata packet 140 to communicate feedback data to NIC 110a and processing unit 112a, request specific routing of packets, and/or request specific data processing.

Figure 8:
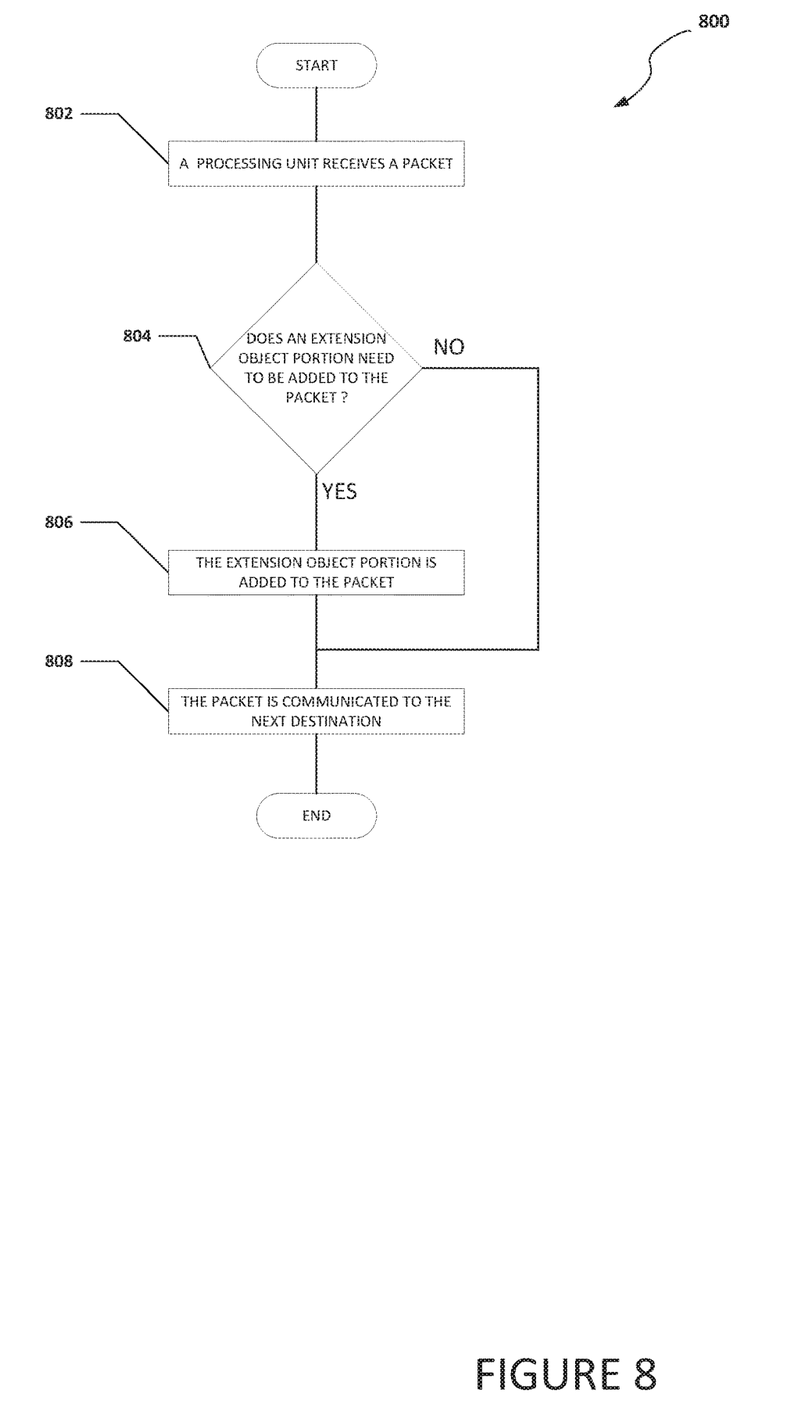
FIG. 8 is a flowchart illustrating potential operations that may be associated with the system in accordance with an embodiment.

Turning to FIG. 8, FIG. 8 is an example flowchart illustrating possible operations of a flow 800 that may be associated with enabling scalable communication with a packet processing unit, in accordance with an embodiment. In an embodiment, one or more operations of flow 800 may be performed by NIC extension object engine 116 and/or a processing unit extension object engine 118. At 802, a processing unit receives a packet. For example, the packet may have been received from a NIC (e.g., NIC 110a, a processing unit (e.g., processing unit 112b or 112d) or remote device 120. At 804, the system determines if an extension object portion needs to be added to the packet. If an extension object portion does not need to be added to the packet, then the packet is communicated to the next destination (without modification), as in 808. If an extension object portion does need to be added to the packet, then the extension object portion is added to the packet, as in 806 and the packet is communicated to the next destination, as in 808. For example, the packet may be communicated from processing unit 112b to NIC 110a on device 104a (a different SoC), NIC 110c on the same SoC, NIC 110g in network element 102c (a different network element), processing unit 112c on the same SoC, processing unit 112d in network element 102c (a different network element), or some other NIC or processing unit. In addition, the packet may be communicated to more than one NIC or processing unit.

Figure 9:
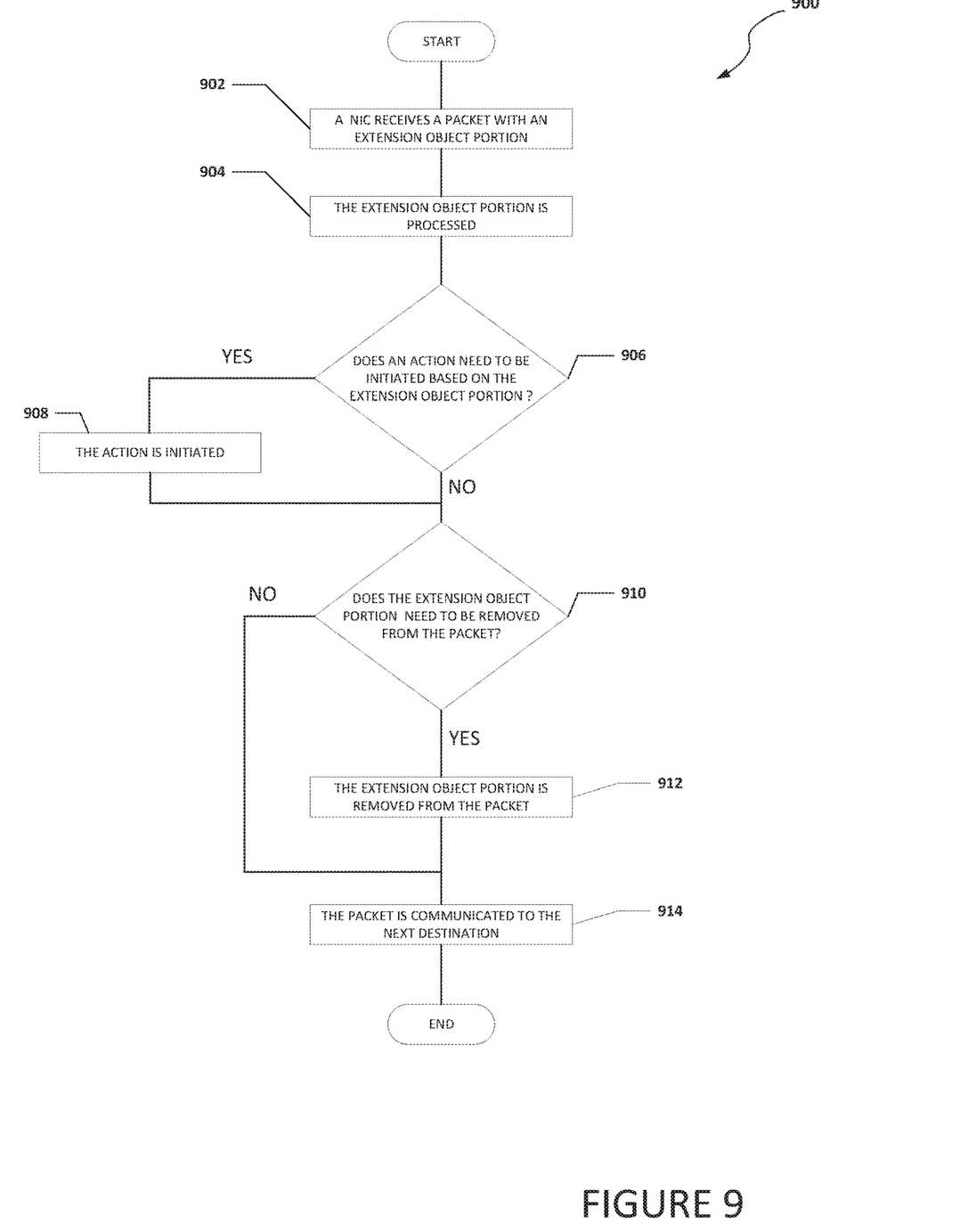
FIG. 9 is a flowchart illustrating potential operations that may be associated with the system in accordance with an embodiment.

Turning to FIG. 9, FIG. 9 is an example flowchart illustrating possible operations of a flow 900 that may be associated with enabling scalable communication with a packet processing unit, in accordance with an embodiment. In an embodiment, one or more operations of flow 900 may be performed by NIC extension object engine 116 and/or a processing unit extension object engine 118. At 902, a NIC receives a packet with an extension object portion. At 904, the extension object portion is processed. For example, the extension object portion may include a type portion 130 that identifies the packet as an enhanced quality source of a video frame. In addition, extension object portion may include one or more partition portions 132a-132c to help the NIC process, analyze, and/or route the packet. At 906, the system determines if an action needs to be initiated based on the extension object portion. If an action needs to be initiated based on the extension object portion, then the action is initiated as in 908, and the system determines if the extension object portion needs to be removed from the packet, as in 910. If an action does not need to be initiated based on the extension object portion, then the system determines if the extension object portion needs to be removed from the packet, as in 910. If the extension object portion does not need to be removed from the packet, then the packet is communicated to the next destination, as in 914. If the extension object portion needs to be removed from the packet, then the extension object portion is removed from the packet, as in 912, and the packet is communicated to the next destination, as in 914. In another example, an extension tag (e.g., metadata portion 134) can be added to the packet before it is communicated to the next destination.

Figure 10:
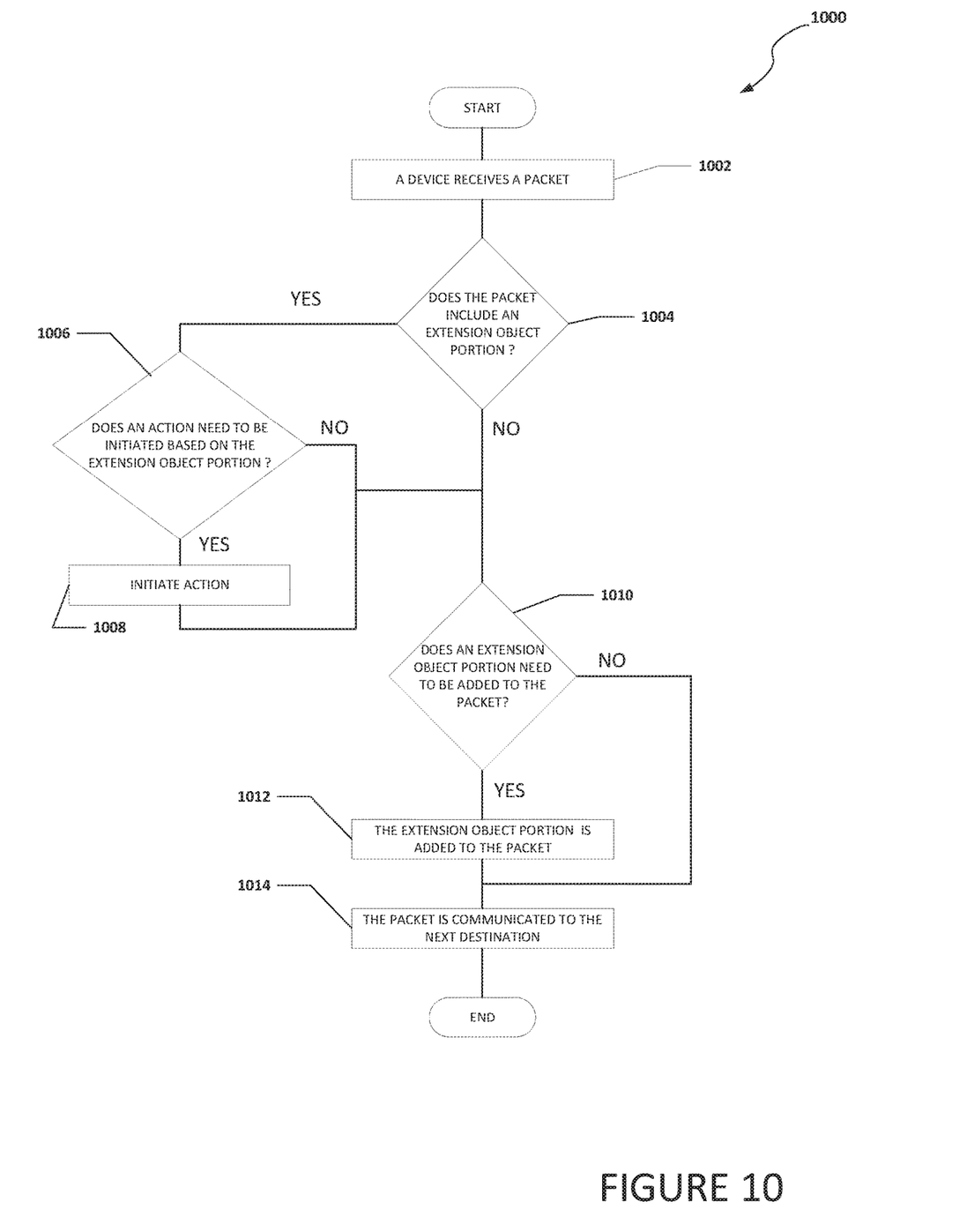
FIG. 10 is a flowchart illustrating potential operations that may be associated with the system in accordance with an embodiment.

Turning to FIG. 10, FIG. 10 is an example flowchart illustrating possible operations of a flow 1000 that may be associated with enabling scalable communication with a packet processing unit, in accordance with an embodiment. In an embodiment, one or more operations of flow 1000 may be performed by NIC extension object engine 116 and/or a processing unit extension object engine 118. At 1002, a device receives a packet. At 1004, the system determines if the packed includes an extension object portion. If the packed includes an extension object portion, then the system determines if an action needs to be initiated based on the extension object portion, as in 1006. If an action does not need to be initiated based on the extension object portion, then the system determines if the extension object portion needs to be removed from the packet, as in 1010. If an action needs to be initiated based on the extension object portion, then the action is initiated as in 1008, and the system determines if the extension object portion needs to be removed from the packet, as in 1010. If the extension object portion does not need to be removed from the packet, then the packet is communicated to the next destination, as in 1014. If the extension object portion needs to be removed from the packet, then the extension object portion is removed from the packet, as in 1012, and the packet is communicated to the next destination, as in 1014. In an example, the next destination may be a similar device as the device that received the packet. More specifically, a processing unit (e.g., processing unit 112b) can communicate the packet to a processing unit on the same device (e.g., processing unit 112c is on the same device 104b as processing unit 112b), a processing unit on the same network element but on a different device (e.g., processing unit 112a is on the same network element 102a as processing unit 112b but processing unit 112a is on device 104b while processing unit is on device 104b), or a processing unit on a different network element (e.g., processing unit 112d is on network element 102c which is different than network element 102a that includes processing unit 112b). In another example, the next destination may be a NIC on the same device (e.g. NIC 110c is on the same device 104b as processing unit 112b), a NIC on the same network element but on a different device (e.g., NIC 110a is on the same network element 102a as processing unit 112b but NIC 110a is on device 104b while processing unit is on device 104b), or a NIC on a different network element (e.g., NIC 110e is on network element 102b which is different than network element 102a that includes processing unit 112b).

It is also important to note that the operations in the preceding flow diagrams (i.e., FIGS. 8-10) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to receive a packet at a processing unit on a system on chip (SoC), add an extension object portion to the packet to create a modified packet, and communicate the modified packet to a network interface controller (NIC) located on the same SoC.

In Example C2, the subject matter of Example C1 can optionally include where the extension object portion is added before a payload portion of the packet.

In Example C3, the subject matter of any one of Examples C1-C2 can optionally include where the packet is an Ethernet packet.

In Example C4, the subject matter of any one of Examples C1-C3 can optionally include where the one or more instructions further cause the at least one processor to communicate the modified packet to a second NIC.

In Example C5, the subject matter of any one of Examples C1-C4 can optionally include where the second NIC is on a second SoC.

In Example C6, the subject matter of any one of Examples C1-C5 can optionally include where the extension object portion includes type data and partition data.

In Example C7, the subject matter of any one of Examples C1-C6 can optionally include where the one or more instructions when executed by the at least one processor, further cause the at least one processor to receive feedback from the NIC regarding the modified packet.

In Example A1, A system on chip (SoC) can include a first network element, memory, an extension object engine, and at least one processor. The at least one processor is configured to cause the extension object engine to add an extension object portion to a packet received at the first network element to create a modified packet, and communicate the modified packet to a second network element located on the same SoC.

In Example, A2, the subject matter of Example A1 can optionally include where the first network element is a processing unit.

In Example A3, the subject matter of any one of Examples A1-A2 can optionally include where the second network element is a network interface controller.

In Example A4, the subject matter of any one of Examples A1-A3 can optionally include where the extension object portion is added before a payload portion of the packet.

In Example A5, the subject matter of any one of Examples A1-A4 can optionally include where the packet is an Ethernet packet.

Example M1 is a method including receiving a packet at a processing unit on a system on chip (SoC), adding an extension object portion to the packet to create a modified packet, and communicating the modified packet to a network interface controller (NIC) located on the same SoC.

In Example M2, the subject matter of Example M1 can optionally include where the extension object portion is added before a payload portion of the packet.

In Example M3, the subject matter of any one of the Examples M1-M2 can optionally include where the packet is an Ethernet packet.

In Example M4, the subject matter of any one of the Examples M1-M3 can optionally include receiving feedback from the NIC regarding the modified packet.

In Example M5, the subject matter of any one of the Examples M1-M4 can optionally include communicating the modified packet to a second NIC.

In Example M6, the subject matter of any one of Examples M1-M5 can optionally include where the second NIC is on a second SoC.

Example S1 is a system for enabling communication between a packet processing unit and a network interface controller (NIC) using an extension object, the system can include memory, one or more processors, and a processing unit extension object engine. The processing unit extension object engine can be configured to cause a packet to be received at the packet processing unit, where the packet processing unit is on a system on chip (SoC), add an extension object portion to the packet to create a modified packet, and cause the modified packet to be communicated to the NIC located on the same SoC.

In Example S2, the subject matter of Example S1 can optionally include where the extension object portion is added before a payload portion of the packet.

In Example S3, the subject matter of any one of the Examples S1-S2 can optionally include where the packet is an Ethernet packet.

In Example S4, the subject matter of any one of the Examples S1-S3 can optionally include where the extension object engine is further configured to receive feedback from the NIC regarding the modified packet.

In Example S5, the subject matter of any one of the Examples S1-S4 can optionally include where the extension object engine is further configured to cause the modified packet to be communicated to a second NIC.

In Example S6, the subject matter of any one of the Examples S1-S5 can optionally include where the second NIC is on a second SoC.

In Example S7, the subject matter of any one of the Examples S1-S6 can optionally include where the second NIC is on the SoC.

Example AA1 is an apparatus including means for receiving a packet at a processing unit on a system on chip (SoC), means for adding an extension object portion to the packet to create a modified packet, and means for communicating the modified packet to a network interface controller (NIC) located on the same SoC.

In Example AA2, the subject matter of Example AA1 can optionally include where the extension object portion is added before a payload portion of the packet.

In Example AA3, the subject matter of any one of Examples AA1-AA2 can optionally include where the packet is an Ethernet packet.

In Example AA4, the subject matter of any one of Examples AA1-AA3 can optionally include means for communicating the modified packet to a second NIC.

In Example AA5, the subject matter of any one of Examples AA1-AA4 can optionally include where the second NIC is on a second SoC.

In Example AA6, the subject matter of any one of Examples AA1-AA5 can optionally include where the extension object portion includes type data and partition data.

In Example AA7, the subject matter of any one of Examples AA1-AA6 can optionally include means for receiving feedback from the NIC regarding the modified packet.

Example X1 is a machine-readable storage medium including machine-readable instructions to implement a method or realize an apparatus as in any one of the Examples A1-A4, AA1-AA7, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one machine readable medium comprising one or more instructions that, when executed by a device, causes the device to:
   receive a packet at a network interface controller (NIC) of the device, the packet to include metadata that indicates requested programming of a processing unit resident on the device;
   remove the metadata and add an extension object portion to the packet to create a modified packet, the extension object portion to include information to program the processing unit based on the requested programming indicated in the metadata; and
   communicate the modified packet to the processing unit to cause the processing unit to be programmed based on the information included in the extension object portion of the modified packet.

2. The at least one machine readable medium of claim 1, wherein the extension object portion is added before a payload portion of the packet.

3. The at least one machine readable medium of claim 1, wherein the packet is an Ethernet packet.

4. The at least one machine readable medium of claim 1, wherein the processing unit, after being programmed, extends a processing capability of the NIC.

5. The at least one machine readable medium of claim 1, wherein the processing unit comprises a field programmable gate array (FPGA).

6. The at least one machine readable medium of claim 5, wherein the extension object portion includes type data and partition data, the partition data to include an FPGA programming stream.

7. The at least one machine readable medium of claim 1, wherein the received packet was communicated to the NIC from an application hosted by the device.

8. A device comprising:
   a processing unit; and
   a network interface controller (NIC) to include circuitry, the circuitry to:
      receive a packet that includes metadata, the metadata to indicate requested programming of the processing unit;
      remove the metadata and add an extension object portion to the packet to create a modified packet, the extension object portion to include information to program the processing unit based on the requested programming indicated in the metadata; and
      communicate the modified packet to the processing unit to cause the processing unit to be programmed based on the information included in the extension object portion of the modified packet.

9. The device of claim 8, wherein the processing unit comprises a field programmable gate array (FPGA).

10. The device of claim 9, wherein the extension object portion includes type data and partition data, the partition data to include an FPGA programming stream.

11. The device of claim 8, wherein the extension object portion is added before a payload portion of the packet.

12. The device of claim 8, wherein the packet is an Ethernet packet.

13. A method comprising:
    receiving a packet at a network interface controller (NIC) of a device, the packet to include metadata that indicates requested programming of a processing unit resident on the device;
    remove the metadata and adding an extension object portion to the packet to create a modified packet, the extension object portion to include information to program the processing unit based on the requested programming indicated in the metadata; and
    communicating the modified packet to the processing unit to cause the processing unit to be programmed based on the information included in the extension object portion of the modified packet.

14. The method of claim 13, wherein the extension object portion is added before a payload portion of the packet.

15. The method of claim 13, wherein the packet is an Ethernet packet.

16. The method of claim 13, wherein the processing unit comprises a field programmable gate array (FPGA).

17. The method of claim 16, wherein the extension object portion includes type data and partition data, the partition data to include an FPGA programming stream.

18. The method of claim 13, wherein the received packet was communicated to the NIC from an application hosted by the device.

19. A device comprising:
    a memory configured to maintain a plurality of queues;
    a network interface controller (NIC); and
    a processing unit to include circuitry, the circuitry to:
       receive a packet including data in a payload portion;
       analyze the packet to determine a queue from among the plurality of queues;
       add an extension object portion to the packet to create a modified packet, the extension object portion to include information to indicate a queue to store the data included in the payload portion; and
       communicate the modified packet to the NIC to cause the NIC to store the data included in the payload portion in the queue indicated in the extension object portion.

20. The device of claim 19, wherein the extension object portion is added before the payload portion of the packet.

21. The device of claim 19, wherein the packet is an Ethernet packet.

22. The device of claim 19, wherein the circuitry of the processing unit is further configured to:
    receive feedback from the NIC regarding the modified packet.

23. The device of claim 19, wherein the processing unit comprises a field programmable gate array (FPGA).

* * * * *